(No Model.)
L. J. BECKER.
HARROW.
No. 550,859. Patented Dec. 3, 1895.
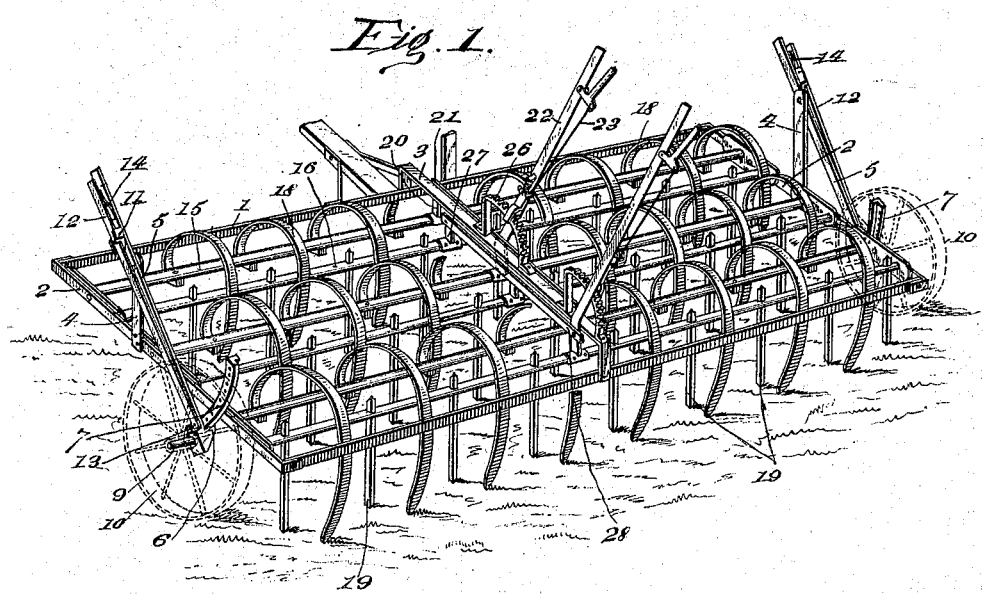
Witnesses:
Theo. L. Gatchel
William P. Wilson
Inventor:
Llewellyn J. Becker.
By F. Benjamin
Attorney.

UNITED STATES PATENT OFFICE.

LLEWELLYN J. BECKER, OF FLEMING, NEW YORK.

HARROW.

SPECIFICATION forming part of Letters Patent No. 550,859, dated December 3, 1895.

Application filed June 29, 1895. Serial No. 554,450. (No model.)

*To all whom it may concern:*

Be it known that I, LLEWELLYN J. BECKER, a citizen of the United States, residing at Fleming, in the county of Cayuga and State of New York, have invented certain new and useful Improvements in Harrows; and I do hereby declare the following to be a full, clear, and exact description of the invention, such as will enable others skilled in the art to which it appertains to make and use the same.

My invention relates to harrows, and has for its object to provide a harrow having spring-teeth and rigid teeth which may be alternately or simultaneously thrown into engagement with the ground.

The invention consists of a frame mounted upon suitable wheels, a series of transverse rods arranged in pairs rotatably mounted in said frame, one of the members of each pair having a series of spring harrow-teeth secured thereto, and the other member having a series of rigid teeth secured thereto, with means for rotating one member of each pair at the same time independently of the other member.

The invention also consists in means for raising and lowering the frame and adjusting the same in any position.

In the drawings, forming a part of this specification, Figure 1 represents a perspective view of my device complete. Fig. 2 represents a detail side elevation of the mechanism for raising and lowering the frame, with the wheel shown in dotted lines.

Like reference-numerals indicate like parts in the views.

The framework of my harrow is made up of longitudinal beams 1, cross-beams 2, and a central beam 3, as clearly shown. Secured to the sides of each of the cross-beams 2 at points near their rear ends is an upright 4, in which is fulcrumed a lever 5, formed with a handle at one end and with an inturned hook or flange 6 at its lower end, which flange bears against the lower side of a guide-segment 7, secured to the cross-beam 2 and provided with a series of recesses or perforations 8 therein. Extending outwardly from the lower end of the lever 5 is a spindle 9, upon which is mounted a wheel 10, supporting the frame of the machine. Near the upper end of the lever 5 is a lug 11, in which is fulcrumed an auxiliary or locking lever 12, which has a tooth 13 projecting inwardly from its lower end through an opening in the lever 5 and adapted to fit the perforations or recesses 8 in the guide-segment 7. By this means it will be seen that the frame of the machine may be raised or lowered.

A flat spring 14, secured to the lever 12 along its inner face, tends to urge the upper end of said lever outwardly and the lower end of said lever, carrying the tooth 13, inwardly. By withdrawing the upper end of the lever 12 the tooth 13 on the lower end of said lever is withdrawn from engagement with the perforation 8 in the segment 7, and then the lever 5, carrying the wheel, is free to be moved up or down. When the proper elevation has been attained, the upper end of the lever 12 is released, and through the action of the spring 14 the lower end of said lever, carrying the tooth 13, is thrown inwardly, and said tooth engages another one of the perforations 8, and the frame is thus held securely.

Rotatably mounted in suitable bearings in the cross-beams 2 are a series of transverse rods 15 16, arranged in pairs. These rods are preferably made of gas-pipe cut longitudinally into two parts. Along the hollow rods 15 are secured in any suitable manner a series of spring-teeth 18. To the rods 16 are secured a series of rigid teeth 19. Extending upwardly from the rods 15 are arms 20, which are connected by means of a connecting-rod 21. One of the arms 20 is extended up beyond the others and forms an operating-lever 22, by means of which all of the arms 20 may be moved in unison. The operating-lever 22 has pivoted to it a locking-lever 23, with a pawl 24 on its lower end, which is adapted to engage a toothed sector 26, secured to the cross-beam 3, heretofore referred to. By this construction it will be seen that by throwing out the lower end of the locking-lever 23 the pawl 24 will be withdrawn from engagement with said sector and the operating-lever 22 is free to be moved in one direction or the other for the purpose of throwing the spring-teeth 18 down into engagement with the ground or to elevate the same out of engagement, according to the direction in which said lever is turned.

The rods 16 have extending upwardly therefrom arms 27, which are connected at their upper ends by a connecting-rod 28 similar to that described with reference to the rods 15. One of the arms 27 is extended upward, forming an operating-lever, which has a locking-lever thereon provided with a toothed lower end, which acts in engagement with a toothed sector in all respects like the locking and turning mechanism described with reference to the rods 15 and the harrow-teeth 18 thereon. It will thus be seen that the spring-teeth 18 may be thrown down into engagement with the ground at the same time that the teeth 19 are, or the teeth 18 and 19 may be alternately thrown into engagement with the ground. Connecting the forward transverse beam 2, of which the frame is made up, is a pole 29 or other suitable form of draft mechanism.

Having thus described the invention, what is claimed as new is—

In a harrow, the combination with a suitable frame, of the wheels supported and adjustable by means of levers, a series of transverse rods rotatably mounted in said frame, series of spring teeth and series of rigid teeth, arranged on alternate rods, and means for rotating each set of alternate rods independently of the other, substantially in the manner described.

In testimony whereof I have signed this specification in the presence of two subscribing witnesses.

LLEWELLYN J. BECKER.

Witnesses:
ROBERT RIBY,
BENJAMIN F. GOULD.